United States Patent Office 2,924,570
Patented Feb. 9, 1960

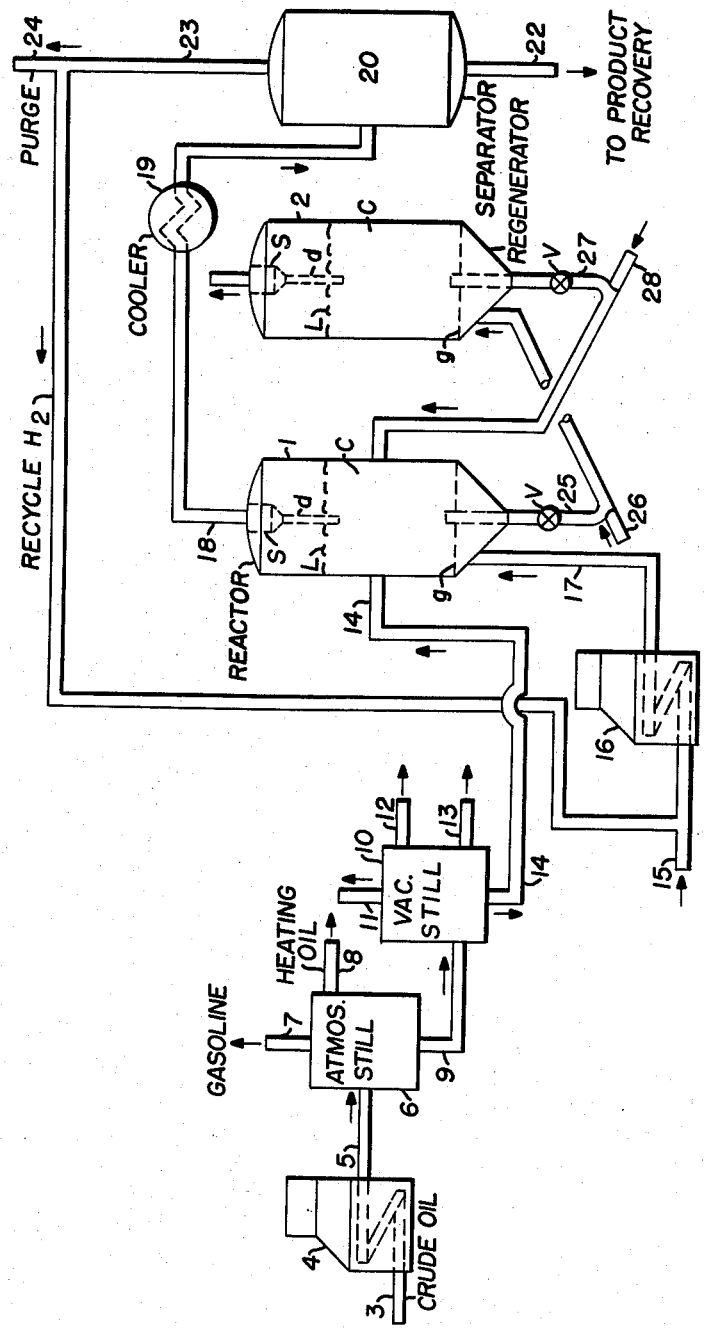

2,924,570

HYDROGENATION OF OILS

John W. Herrmann, Elizabeth, and Frank T. Barr, Summit, N.J., assignors to Esso Research and Engineering Company, a corporation of Delaware Application July 20, 1956, Serial No. 599,198

1 Claim. (Cl. 208—143)

The present invention relates to improvements in upgrading crude petroleum oils, and more particularly, relates to the continuous hydrogenating of such oils in the presence of a fluidized bed of hydrogenation catalyst to produce lower boiling products in a two vessel system in which the hydrogenation occurs in one vessel and the catalyst is regenerated in the second vessel.

The hydrogenation of oils is becoming increasingly important in the petroleum field. Many crudes contain sulfur and, of course, it is desirable to remove such sulfur from the oil and at the same time to obtain a product which is free also of mineral constituents. This may be accomplished by treatment of the whole or reduced crude with hydrogen according to the hereinafter more fully described process. It is pointed out that the present improved process, in one aspect thereof, effects a hydrocracking of the hydrocarbon oil to form useful products of lower boiling range, such as gas oil for cracking, domestic heating oil, kerosene and the like. Also residual oils such as Bunker C fuel may be hydrogenated according to the present invention to reduce the asphaltene content and form a fuel which has improved burning properties in that less soot and smut is formed.

The cost of hydrogen is an important item in a process such as the one contemplated herein. However, in recent years hydroforming of naphthas to improve the octane rating of said naphthas has provided a relatively new source of industrial hydrogen. The hydroforming of naphthas, although hydrogen is fed to the reaction zone together with the naphtha to be treated, invariably results in a net production of hydrogen and such excess hydrogen is, of course, eminently suitable for use in the present process. Other sources of hydrogen are available such as subjecting methane or natural gas to cracking and also by the iron-steam process. Furthermore the present process provides means whereby further economies may be effected by carrying out the present hydrogenation continuously and in such a manner that the catalyst employed may be regenerated and reused. Also the present process is one which may be operated at relatively low pressures thus affording further economies in the matter of equipment and utilities.

In brief compass therefore the present invention provides means for hydrogenating a hydrocarbon oil such as a whole crude or reduced crude at relatively low pressures in the presence of a fluidized bed of a hydrogenation catalyst in a system where means are also provided for frequently regenerating the catalyst, which catalysts cannot be used in fixed bed operation economically since the on-stream periods are so short since the catalyst is rapidly deactivated by the deposition of carbonaceous and other deposits thereon, requiring discontinuance of the feed to remove, by regeneration, such deactivating deposits. The economic advantages of continuous operation are attained by the present process and the further important features of substantially uniform temperatures in the hydrogenation zone, good contact between the catalyst and oil, and otherwise there is provided an efficient process which is at the same time economically feasible. With further respect to the economical features of the present invention it is pointed out that the present process is operated at a relatively low pressure whereby there results an increased quantity of coke or carbon, over and above that of the conventional process. While this feature results in some loss in liquid yield, this process provides an economical advantage in that less hydrogen is required for a given degree of conversion and since the catalyst is frequently or continuously regenerated the incremental increase in carbon formation presents no serious problem.

Heretofore and prior to the present invention, others, as indicated, have proposed upgrading by hydrogenation crude petroleum oils and residues thereof in fixed bed catalyst types of operation and at pressures of the order of 400–3000 p.s.i.g. which type of operation necessitates a high investment cost for equipment such as compressors and utilities necessary to carry out such a process.

An object of the present invention is to provide a method of upgrading whole or reduced crude petroleum oils to produce lower boiling materials with low asphaltene content suitable as a feed stock for catalytic cracking, as a domestic heating oil, as a kerosene, for diesel oil and other products which are substantially free of sulfur, metals, such as vanadium, iron, etc., salts and other undesirable constituents by means of a simplified technique which results in a lowered cost in producing the above products.

Another object of the present invention is to hydrogenate crude petroleum oils or residues thereof in the presence of a suitable catalyst at relatively low pressures.

Another object of the present invention is to hydrogenate crude petroleum oils in a system permitting a lower hydrogen consumption than previously required with a correspondingly higher carbon production, thus making the plant or system sufficiently inexpensive to be economically attractive.

Other objects of the invention will be apparent from the ensuing description and claim.

In the accompanying drawing, there is set forth diagrammatically, the essential components of a plant in which the present invention may be carried into effect.

In the drawing similar references refer to similar parts.

Referring in detail to the drawing, 1 represents a reactor containing a fluidized bed of hydrogenation catalyst C and 2 represents a vessel containing a fluidized bed of catalyst C undergoing regeneration, the vessels 1 and 2 being in communication by means of transfer lines or pipes permitting circulation of the catalyst from the reactor to the regenerator for treatment with regeneration gas, and after such treatment return to the reactor 1.

In operation of the plant indicated in the drawing, a crude petroleum oil is charged via line 3 to a furnace or other heating means 4 where it is heated to a temperature of about 700° F., thence withdrawn through line 5 and charged to the first still 6 of a two-stage distillation operation. In still 6 the oil is subjected to distillation at a temperature of about 700° F. while under atmospheric pressure. In a plant processing 50,000 barrels of crude oil per stream day there is attained overhead through line 7 a gasoline fraction amounting to about 2500 barrels per stream day and this gasoline fraction boiling in the range from about 0–400° F. is delivered to storage (not shown). Because this naphtha fraction possesses a relatively low octane rating it may be subjected to hydroforming according to conventional practice and the excess hydrogen produced in the hydroforming operation may be used in the present process. Because the hydroforming operation is invariably carried out under superatmospheric pressure the hydrogen obtained from the hydroforming of the said naphtha or gasoline will not require compression. A side stream may be taken off from still 6 via line 8 and this side stream boiling in the range from about 400°–650° F. may be utilized as a heating oil, a catalytic cracking feed stock or otherwise converted to some useful product. The amount of this fraction is approximately 30% of the fresh feed. The heavy bottoms amounting to about 60% of the fresh feed barrels is withdrawn from the first stage distillation zone via line 9 and charged to a vacuum still 10 where it is subjected to further distillation under pressure of about one p.s.i. In still 10 there is taken off overhead via line 11 a fraction boiling within the range of from about 650°–850° F., a second fraction boiling within the range of from about 850°–950° F. is taken off via line 12, and a third fraction boiling within the range of from about 950°–1100° F. is taken off via line 13. These three fractions may be utilized in a known manner. For example, the fractions derived via lines 11 and 12 respectively may be used as a catalytic cracking stock. The fraction withdrawn via line 13 may be used as an industrial fuel. Those familiar with the art will understand that the two-stage distillation previously described is conventional in the art and the petroleum engineer will be enabled to convert these lower boiling fractions to some important use.

The heart of the invention resides in the treatment to which the bottoms recovered from still 10 via line 14 are further treated. As previously indicated these bottoms boil from 1100° F. upwardly. According to the example given, about 16,000 barrels per stream day, or roughly about 30% of the original feed stock, are converted under relatively mild conditions in a two-vessel system by hydrogenation into useful products. Toward this end therefore material in line 14 is charged to reactor 1 containing a fluidized bed of catalyst C carried on a foraminous member g and extending to an upper dense phase level L. Hydrogen for the process, which hydrogen may be derived from any suitable source including from a hydroforming operation previously mentioned, is introduced into the present system via line 15 and charged to a preheating furnace 16 where it is heated to a suitable temperature hereinafter more fully described, thence withdrawn through line 17 and charged into a lower point of reactor 1 wherein it flows upwardly through gas distributing means G and mixes with the oil charged to the bed of catalyst C. The inlet temperature of the oil and $H_2$ entering reactor 1 is about 750° F. As will subsequently appear, heat is transferred from regenerator 2 as sensible heat of the hot regenerated catalyst flowing from regenerator 2 to reactor 1. Furthermore, since the hydrogenation of the oil is exothermic, additional heat is thus supplied to reactor 1.

Under conditions more fully set forth hereinafter, the desired conversion or hydrogenation reaction occurs and the vaporiform and/or gasiform products and excess hydrogen-containing material passes through the bed C and enters a catalyst disengaging space disposed between L and the top of the reactor wherein entrained catalyst is separated from the crude product vapors and gravitated toward the dense fluidized bed C. The catalyst, of course, must be prepared or ground to a fluidizable size, varying in a particle size of from 0 to about 200 microns, the major portion of which, say, 50–60% of the catalyst, having a particle size in the range of from about 40–80 microns. Before the gasiform and/or vaporiform material is withdrawn from the reactor, fines entrained therein are removed by any suitable means, such as filters or one or more of the "cyclone" separators S indicated in the drawing, wherein the last traces of catalyst are removed from the crude product and returned to the dense bed by one or more dip pipes d. The product is withdrawn from the reactor via line 18, thence forced through a cooling means 19 and thence delivered to a separation drum 20. The crude product, which has been cooled in 19 sufficiently to condense normally liquid constituents thereof, is separated in 20 into its gas and liquid components, the liquid product being withdrawn through line 22 and delivered to equipment (not shown) to recover desired products. Gasiform material is recovered overhead from separator 20 and recycled via line 23 to line 15 for further use in the process. It may be desirable to scrub this recycle stream for $H_2S$ removal by conventional means such as by forcing the cooled gas through an aqueous alkaline solution such as a water solution of ethanolamine or any other aqueous medium adapted to dissolve out the $H_2S$ (not shown). Excess gasiform material may be rejected from the system through purge line 24 and in this manner accumulation of normally gaseous hydrocarbons in the system is prevented. This recycled material in line 23 will have a hydrogen concentration of from 60 to 80 molal percent. Make-up hydrogen is continuously added to the system as required via line 15, the source of the hydrogen being a naphtha hydroforming plant, in the preferred embodiment of the invention.

During the reaction occurring in reactor 1, carbon is formed on the catalyst and it is necessary to remove this carbon to maintain the said catalyst in a high state of activity. Toward this end catalyst is withdrawn from reactor 1 via line 25, controlled by valve V and charged into a flowing stream of air in line 26, and the catalyst is carried in suspension into regenerator 2 at a lower point thereof, the suspension of catalyst in air or other oxygen-containing gas passes into the reactor forming the fluidized bed C. Under conditions more fully set forth hereinafter, the carbonaceous and other deposits formed on the catalyst, including sulfur bodies, are consumed by combustion, and the resulting fumes pass from the bed of catalyst C through a disengaging space positioned between L and the top of the regenerator wherein the main bulk of the catalyst is separated from the fumes and gravitate toward the bed of catalyst C. Before the fumes are withdrawn from the regenerator, they are passed through one or more gas-solids separating devices S wherein the catalyst fines persisting in the said fumes are separated and returned to the bed C through one or more dip pipes d. The fumes withdrawn from the reactor contain sensible and chemical heat, and this may be utilized in suitable equipment (not shown) in the system, for example, to preheat the crude oil, the hydrogen, or to make steam. The regenerated catalyst is withdrawn from regenerator 2 through line 27, controlled by valve V and charged into a flowing stream of a carrier gas in line 28 and carried in suspension into reactor 1. The carrier gas may be make-up hydrogen, or a portion of the recycle gas in line 23.

In order more fully to explain the present invention, the following example is set forth. A Bachaquero crude was subjected to two stages of distillation, viz., first, an atmospheric distillation and then a vacuum distillation.

EXAMPLE

The Bachaquero whole crude petroleum oil referred to above and in column A below and the 1100+° F. bottoms resulting from the above vacuum distillation and referred to below in column B, had the following inspections.

| | A<br>Whole<br>Crude | | B<br>1,100+° F.<br>Residuum |
|---|---|---|---|
| Gravity, API° | 16 | Gravity, API° | 2.0 |
| S, wt. percent | 2.5 | Conradson carbon, wt. percent | 30 |
| Conradson carbon, wt. percent | 10.8 | MNI, wt. percent | 32 |
| Mineral ash, wt. percent | 0.1 | S, wt. percent | 3.8 |
| MNI,[1] wt. percent | 9.3 | Ni, p.p.m | 145 |
| Ni, p.p.m | 45 | V, p.p.m | 1,170 |
| V, p.p.m | 360 | | |

[1] NMI = modified naphtha insolvents and has reference to the burning qualities of a fuel. A value of 9.3 or lower indicates a fuel which burns without forming smudge.

Material boiling up to about 400° F. was recovered by distillation and subjected to catalytic hydroforming to produce a motor fuel of improved octane and excess hydrogen.

The middle oils obtained by distillation may be employed as cracking feed stock and for other known purposes. The above residuum obtained from the vacuum distillation was hydrogenated under the following conditions.

| | |
|---|---|
| Catalyst | [1] Cobalt molybdate. |
| Temperature, ° F | 850. |
| Pressure, p.s.i.g | 100. |
| Oil feed rate, w./hr./w | 0.5. |
| Hydrogen feed rate, fresh and recycle, s.c.f./bbl. feed oil | 1500. |
| Concentration of fresh feed hydrogen, mol percent | 98. |
| Recycle ratio of fresh H₂/recycle H₂ | 1.0. |
| Conc. of H₂ in recycle, vol. percent | 75. |

[1] Any good hydrogenation catalyst such as Pt, Ni, etc. may be used.

Operating on a Bachaquero reduced crude under the above conditions the following results were obtained.

*Hydrogenation of Bachaquero 41% residuum product yield and quality data*

[Values in parentheses are for corresponding virgin fractions from whole crude.]

| Fraction | Naphtha | Heating Oil | Gas Oil |
|---|---|---|---|
| Yield,[1] Percent on Residuum Converted | 0 | 25 | 75 |
| Product Quality: | | | |
| Gravity, °API | | 33 (26) | 17 (13) |
| Aniline Point, °F | | 133 (127) | |
| Diesel Index | | 44 (33) | |
| Sulfur, Wt. percent | | 0.5 (2.2) | 1.1 (2.7) |

[1] The liquid product yield was 100% on a volumetric basis, based on feed. On a gravimetric basis, the liquid yield based on feed was 86%. The carbon formed was 6% by weight and the gas formed was 8% by weight.

It will be noted from the foregoing inspection that good yields of good quality products are obtained. The advantage of the present process over the conventional fixed bed operation or the high pressure sump phase destructive hydrogenation process, resides largely in the economic attractiveness of the present process, since the moderate pressure and otherwise mild conditions, important economies in compressor capacity, other equipment and utilities, are attainable. In addition, of course, the present process provides continuity of operation, relatively low hydrogen consumption, a system which is self-sufficient with respect to heat requirements, provides a simple, continuous, economically attractive method for frequently regenerating catalyst and is otherwise simplified and improved.

During the hydrogenation reaction, 2.5 to 6.0 weight percent of carbonaceous material, based on feed, is laid down on the catalyst. The catalyst is regenerated at temperatures of from about 950° F., utilizing air or other oxygen-containing gas in a manner which is known to the art. It will be observed that the amount of carbon formed during the hydrogenation may be relatively large and therefore there is some loss of yield. However, since the process is operated continuously and furthermore since the catalyst may be regenerated frequently and continuously the present process has a distinct advantage over the fixed bed type of operation for there, of course, the on-stream period would have to be discontinued in order to regenerate the catalyst unless the process were operated at very high pressures and with much higher hydrogen consumption. Thus the saving in compressor capacity and other equipment and utilities and in particular the reduced amount of hydrogen which is required in this present process more than offsets the loss in yield and renders the present process commercially feasible. The heat released during the regeneration of the catalyst in the present process may be transferred to the reaction zone as sensible heat of the regenerated catalyst or the heat from this hot catalyst may be utilized for some other purpose such as to make steam. Extraneous fuel may be added if necessary.

It will be understood by those familiar with the present art, that the drawing depicts merely the essential components of a commercial plant, and the experienced engineer will appreciate that additional accessory apparatus will be included in the plant to recover available heat, to control flow rates of reactants and catalyst, as well as to control temperature and pressure conditions in the system and otherwise to take advantage of conventional apparatus and control instruments.

The foregoing example is merely illustrative of the present invention and good results are obtainable by operating under the following conditions in reactor 1.

CONDITIONS IN REACTOR 1

| | |
|---|---|
| Feed | Whole or reduced crude. |
| Catalyst | Any good hydrogenation catalyst known to the art. |
| Temperature, ° F. | 700–1000. |
| Pressure, p.s.i.g. | 50–200. |
| Oil feed rate, w./hr./w. to w./hr./w | 0.5–2.0. |
| Hydrogen feed rates, s.c.f./bbl. of oil | 750–3000. |

A good way to operate the present invention is to do so in conjunction with a hydroforming plant from which hydrogen may be obtained. For example, the hydrogen, obtained from a hydroforming plant utilizing a platinum-containing catalyst, may have a hydrogen concentration of from 75–90 mol. percent. This hydrogen-containing gas may be obtained under superatmospheric pressure and after suitable heating may be fed directly to the present hydrogenation plant, thus saving hydrogen compressor costs.

Many modifications of the present invention may be made by those familiar with the presenting art without departing from the spirit thereof.

What is claimed is:

A continuous method for upgrading a crude petroleum oil employing a catalytic hydrogenation zone and a catalyst regeneration zone, which comprises subjecting a whole crude petroleum oil to two stages of distillation, including a first stage for removing components boiling up to about 650° F. and a second stage in which components that boil in the range of 650°–1100° F. are distilled under vacuum to leave a heavy bottoms which boils upwardly from 1100° F., providing a dense fluidized bed of a cobalt molybdate hydrogenation catalyst in the reaction zone, charging said heavy bottoms into an intermediate part of said dense fluidized bed in said reaction zone, distributing hydrogen gas into said dense fluidized bed at the bottom thereof, said hydrogen gas being charged at the rate of about 750–3000 standard cubic feet per barrel of said heavy bottoms fed into said reaction zone, contacting the hydrogen gas with the heavy bottoms as the gas flows upwardly through the dense fluidized bed of catalyst at a temperature of about 700°–1000° F. while maintaining a pressure of about 50–200 p.s.i.g. in said recation zone, withdrawing vapor conversion products and gas which pass through the upper part of said bed, the heavy bottoms oil remaining in said bed for desired conversion, continuously withdrawing catalyst from said bed in the reaction zone to the regeneration zone, burning carbonaceous deposits on the catalyst in said regeneration zone, and continuously recycling regenerated catalyst from said regeneration zone to said bed in the reaction zone.

References Cited in the file of this patent

UNITED STATES PATENTS

| | | |
|---|---|---|
| 2,447,043 | Welty et al. | Aug. 17, 1948 |
| 2,662,846 | Montgomery et al. | Dec. 15, 1953 |
| 2,700,014 | Anhorn et al. | Jan. 18, 1955 |
| 2,703,308 | Oblad et al. | Mar. 1, 1955 |
| 2,717,866 | Doering et al. | Sept. 13, 1955 |
| 2,756,186 | Owen et al. | July 24, 1956 |
| 2,768,936 | Anderson et al. | Oct. 30, 1956 |
| 2,769,769 | Tyson | Nov. 6, 1956 |
| 2,799,626 | Johnson et al. | July 16, 1957 |